May 1, 1945. H. M. PFLAGER 2,374,777
RAILWAY TRUCK STRUCTURE
Filed Dec. 26, 1942 3 Sheets-Sheet 1

INVENTOR;
HARRY M. PFLAGER
BY Rodney Bedell
ATTORNEY

May 1, 1945. H. M. PFLAGER 2,374,777
RAILWAY TRUCK STRUCTURE
Filed Dec. 26, 1942 3 Sheets-Sheet 2
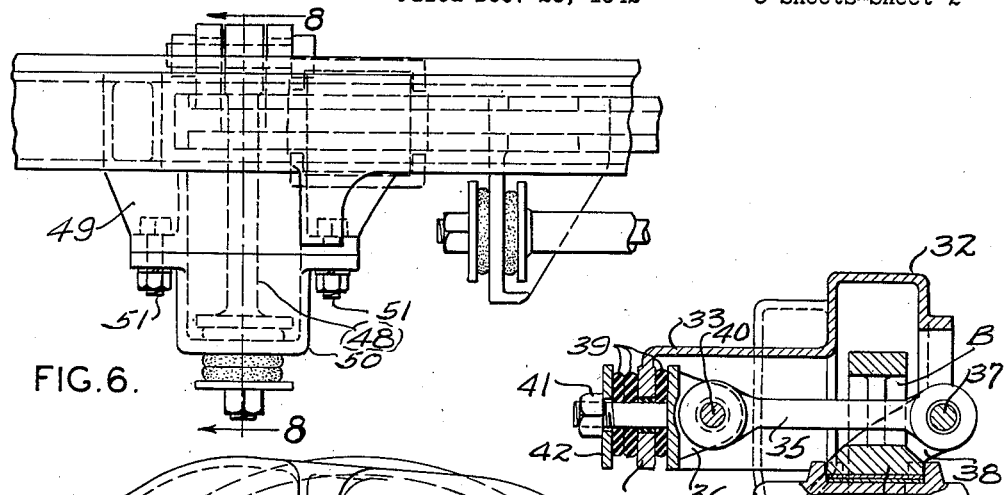
FIG. 6.
FIG. 5.
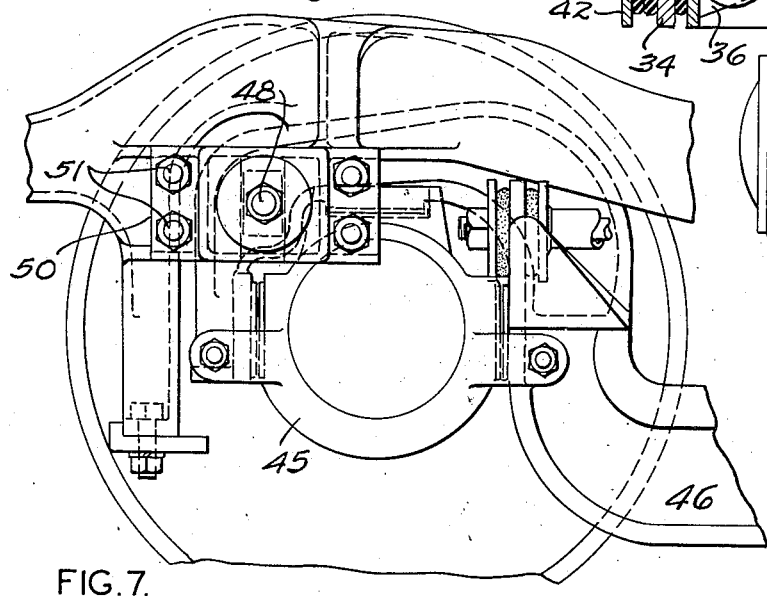
FIG. 7.
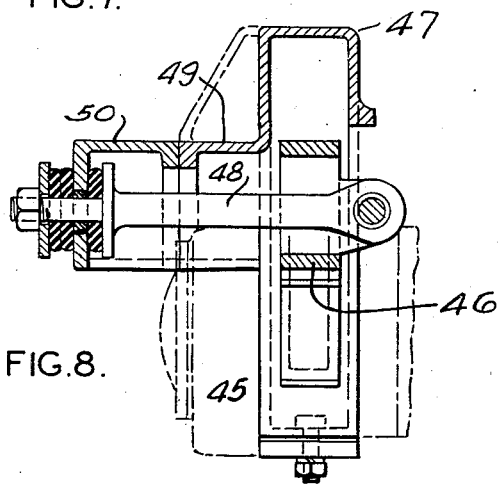
FIG. 8.
INVENTOR;
HARRY M. PFLAGER
BY Rodney Bedell
ATTORNEY May 1, 1945.  H. M. PFLAGER  2,374,777
RAILWAY TRUCK STRUCTURE
Filed Dec. 26, 1942  3 Sheets-Sheet 3

INVENTOR:
HARRY M. PFLAGER
BY Rodney Bedell
ATTORNEY

Patented May 1, 1945

2,374,777

UNITED STATES PATENT OFFICE 2,374,777

RAILWAY TRUCK STRUCTURE

Harry M. Pflager, St. Louis, Mo., assignor to General Steel Castings Corporation, Granite City, Ill., a corporation of Delaware Application December 26, 1942, Serial No. 470,148

11 Claims. (Cl. 105—182)

This invention relates to rolling stock trucks in which the truck frame is carried on springs resting on journal boxes or journal box equalizers. One ordinary type of truck in general use in passenger trains has a truck frame with so-called pedestal legs or projections extending down from the frame and riding in grooves in the journal boxes, thus holding the frame and box against relative movement laterally and longitudinally of the truck.

The purpose of this invention is to provide a truck which eliminates the pedestal jaws and their wearing surfaces, and to provide simple means on a truck for retaining the frame and boxes in normal relative position laterally and longitudinally of the truck.

The truck is provided with longitudinally disposed anchor rods between the side of the truck frame and the equalizer to retain the journal boxes in normal position relative to the frame longitudinally of the truck. The truck is also provided with transversely disposed anchor rods over each journal, connecting the truck frame and the box at the point where the thrust is delivered from the box to the frame and immediately above the box and maintaining their relative position laterally of the truck, thus producing a light and satisfactory construction in a pedestalless truck. These anchor rods permit the truck frame to move readily vertically of the boxes, improving the riding of the car and avoiding the expense of maintaining the frictional wear which takes place in the ordinary trucks with grooved journal boxes working in pedestals.

Another advantage of this construction is the elimination of metal to metal contact between the truck frame and journal boxes, thereby avoiding noise due to shocks transmitted between the parts.

However, because of the proximity of the wheels and journal boxes, it would be difficult or impossible to readily apply the anchor rods to these places, and it is a further object of the invention to construct the anchor rods and associated parts so as to accommodate the desired positioning of the anchor rods as mentioned.

These and other detail objects of the invention are attained by the structures illustrated in the accompanying drawings, in which—

Figure 5 is a vertical section corresponding generally to Figure 4 but illustrating another from of the invention.

Figure 6 is a detail top view of the portions of a truck adjacent to the connection between the frame and equalizer and embodying another form of the invention.

Figure 7 is a side elevation of the same.

Figure 8 is a detail vertical section taken on the line 8—8 of Figure 6.

Figures 9, 10, 11:
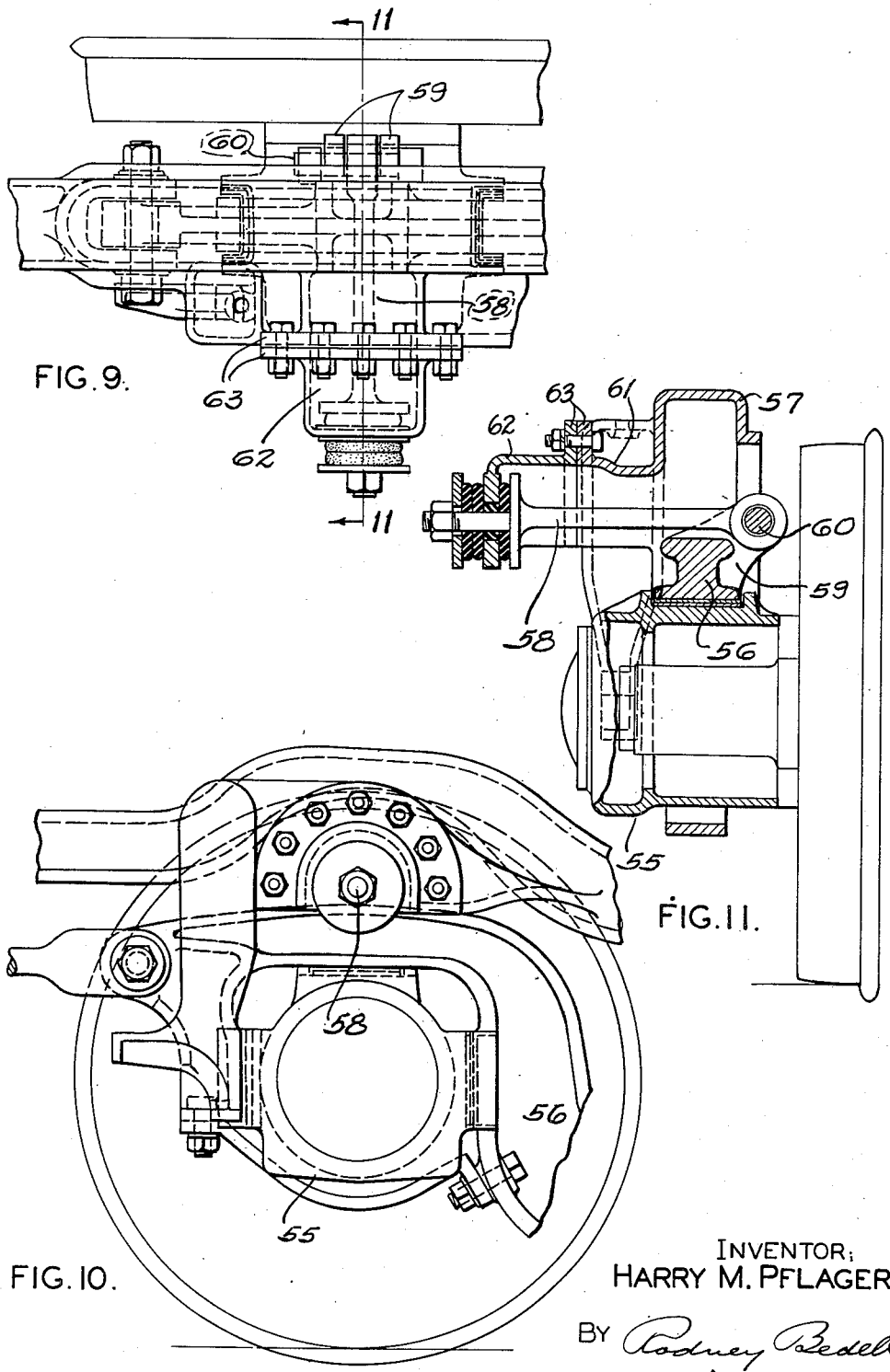

Figures 9, 10 and 11 correspond to Figures 6, 7 and 8 but illustrate another form of the invention.

Figure 1:
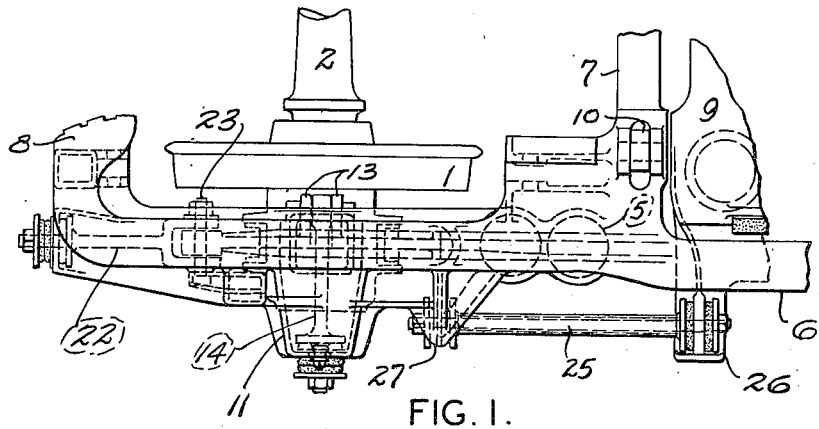
Figure 1 is a top view of one-quarter of a four-wheel truck of the class described.
Figure 2:
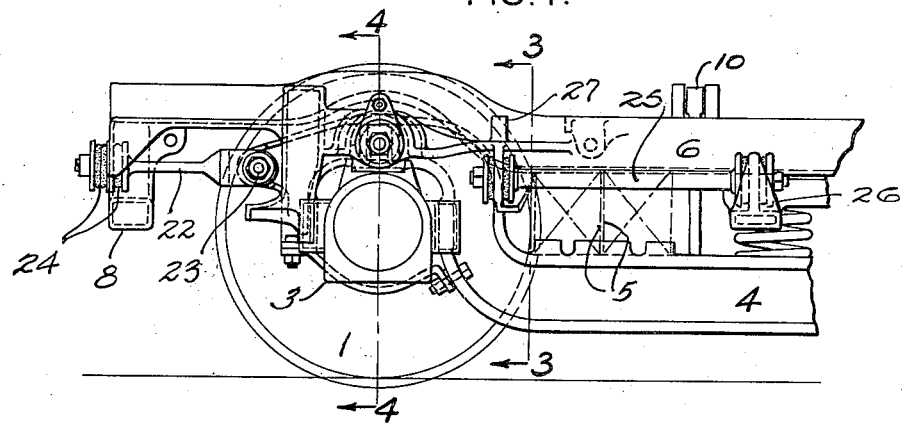
Figure 2 is a side elevation of the same.
Figure 3:
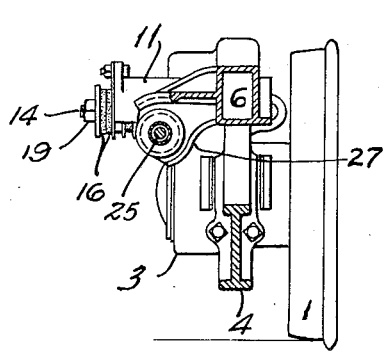
Figures 3 and 4 are detail vertical transverse sections taken on the corresponding section lines of Figure 2.
Figure 4:
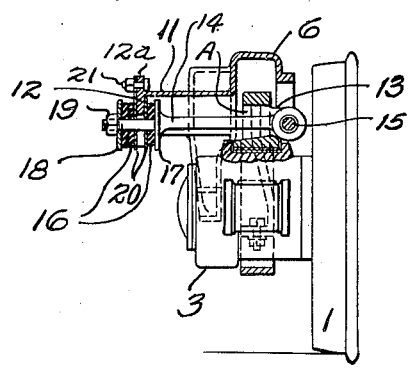

It will be understood that the truck parts shown in Figures 1 and 2 are duplicated at the opposite side of the truck and at the opposite end of the truck and that the truck will include a plurality of wheels 1, axles 2 and journal boxes 3. Extending between and carried upon the journal boxes at each side of the truck is an equalizer 4 which mounts a plurality truck springs 5. A truck frame is supported upon springs 5 and includes wheel pieces 6, center transoms 7 and end bracket 8 for brake rigging. A bolster 9 may be suspended from transom 7 by swing hangers 10 in a well known manner and the truck load will be carried upon the bolster 9. All of the above-described structure is well known in the art and in itself does not constitute the present invention.

Since the truck frame moves vertically relative to the journal boxes, axles and equalizers, its wheel pieces 6 must extend over the journal boxes and means must be provided to prevent or limit the relative lateral movement of the frame, equalizer, journal boxes and axles. To this end the truck frame wheel piece 6 is recessed upwardly over the journal box and there provided with a bracket 11 extending outwardly of the truck beyond the outer end of journal box 3 and terminating in a depending flange 12 spaced a substantial distance from the equalizer. The equalizer is provided with an aperture A abreast of flange 12 and ears 13 on the equalizer extend inwardly of the truck at the sides of aperture A and are spaced farther from bracket flange 12 than the body of the equalizer.

An anchor rod 14 extends transversely of the truck with one end connected by a pin 15 to ears 13 on the equalizer and with its other end mounting rubber pads 16 at opposite sides of flange 12. One of the pads is clamped between the flange and a shoulder 17 on rod 14 and the other pad is clamped between the flange and collar 18 on the outer portion of the rod adjustably positioned by a nut 19 threaded onto the rod. Washers 20 may be inserted between each pad and the bracket flange 12 to adjust the effective length of the anchor rod, and the outer of these washers is extended upwardly and removably secured to an upward extension 12a on flange 12 by a bolt 21, and thus affords a support for the outer end of the anchor rod in the event the area of the pads and the thrust thereon is insufficient to keep them from dropping from their normal position indicated.

Each end of the truck frame is connected to the adjacent end of the equalizer by another anchor rod 22 constructed similarly to rod 14 and pivotally connected to the end of the equalizer by a removable bolt 23 and yieldingly connected to the end of the truck frame by rubber-like pads 24 clamped against opposite sides of an upright web on the end transom.

Anchor rods 14 and 22 maintain the relative positions of the truck frame and equalizer transversely and longitudinally of the truck and accommodate relative movements of these parts vertically. During such relative vertical movements, the rods will be inclined from their normal horizontal positions and such inclination will distort the pads, thereby affording yielding resistance to the movement and tending to return the connected parts to their normal position. Forces applied longitudinally of the anchor rods will be cushioned by pads 16 and 24, avoiding metal to metal contact, but there will be no substantial movement between the parts as the result of such forces. If desired, only one anchor 22 would be used for each equalizer instead of one at each end.

Bolster 9 is held against relative movement longitudinally of the truck by an anchor device 25 connected at its opposite ends to bracket 26 and 27 on the bolster and truck frame respectively. Anchor device 25 is constructed and functions as illustrated and described in V. L. Green Reissue Patent 21,987, issued December 30, 1941, and, in addition to positioning the bolster longitudinally of the truck frame, yieldingly resists its lateral swinging movement on hangers 10. It will be understood that only one anchor 25 is provided between each end of the bolster and the truck frame.

The construction described provides a connection between the truck frame and equalizer immediately above each journal box and in substantially the same vertical plane in which the lateral thrusts are applied to the equalizer by the shifting of the wheels and axles transversely of the truck because of curvature of the track, rail joints and inequalities and other forces tending to shift the frame and equalizer relative to each other. Those portions of the equalizer and truck frame spaced longitudinally of the truck from the journal boxes are freed of connections transmitting such lateral thrusts, and therefore bending moments in the equalizer, due to lateral thrusts between the same and truck frame, will be substantially eliminated or, at least, reduced to a minimum as compared with the moments resulting from the transmission of such forces by connections between the equalizers and frame at the end of the latter or intermediate the axles.

Figure 5 illustrates another form of one feature of the construction described above. In this arrangement, journal box 30, equalizer 31, the truck frame wheel piece 32 and its bracket 33 are substantially the same as the corresponding parts previously described except that the depending flange 34 on the bracket has a round aperture instead of having a downwardly opening slot. The anchor device comprises aligned links 35 and 36, link 35 corresponding to the right hand portion of rod 14 and similarly projecting through an aperture B in equalizer 31 and being similarly pivotally connected by a bolt 37 to ears 38 on the equalizer. Link 36 corresponds to the left hand end of anchor rod 14 and similarly clamps rubber-like pads 39 against the bracket flange 34. Links 35 and 36 are connected by a detachable bolt 40.

This construction facilitates the assembly and disassembly of the anchor device with the equalizer and truck frame while the latter are in their normal assembled relation. With the links detached from each other, the inner end of link 35 may be inserted through aperture B and pinned to ears 38. The shank of outer link 36, with its clamping nut 41, washer 42 and outer pads 39 removed, may be inserted through the hole in flange 34 and outer pads 39, washer 42 and nut 41 applied, and the two links may be pinned together at 40. With this arrangement, the outer end of the anchor rod cannot drop from the bracket flange and there is no need of a separate support, bolt and flange projection as indicated at 12, 12a and 21 in the form previously described.

Figures 6–8 illustrate another form of the invention in which the journal box 45, equalizer 46 and frame wheel piece 47 are substantially the same as the corresponding parts previously described and the anchor rod 48 is substantially the same as the anchor rod 14 shown in Figures 1–4 but the bracket on the truck frame is formed in two pieces 49 and 50 respectively, which are detachably secured to each other by bolts 51. This construction of the frame bracket facilitates assembly and disassembly of the anchor rod device with the equalizer and frame while the latter are in their normal assembled positions.

This form of the invention also shows the anchor rod shifted longitudinally of the truck a short distance from the vertical plane of the axle (although the anchor rod remains adjacent to the journal box). This makes it possible to position the anchor rod at a lower level than if it were directly over the center of the journal box, and accordingly the depth of the truck frame may be increased to provide for greater strength at this point or to provide greater amount of clearance between the truck and the underframe of the vehicle body (not shown). It will be understood that the same results may be obtained by similarly shifting the anchor rods in all of the other forms of the invention described herein.

Figures 9, 10 and 11 illustrate another form of the invention in which the journal box 55, equalizer 56, truck frame wheel piece 57 and anchor rod 58 are substantially like the corresponding parts previously described except that the equalizer is not apertured for the passage of the anchor rod but the portion of the equalizer over the journal box is reduced in height and the anchor rod is at a high enough level that it may extend over the adjacent portion of the equalizer and be connected to inwardly and upwardly extending ears 59 by a removable pin 60, as in the similar connections previously described. The two-part frame bracket 61, 62 corresponds generally to that shown in Figures 6, 7 and 8, but the bracket is centered over the journal box and the bolting flanges 63 are disposed in an arc about the anchor rod.

It will be understood that the other forms of the invention described above may also be modified to position the anchor rod above the end of the equalizer instead of passing it through an aperture in the equalizer. Other variations in the arrangements and details may be made without departing from the spirit of the invention, and the exclusive use of those modifications coming within the scope of the claims is contemplated.

What is claimed is:

1. In a railway truck, spaced axles with wheels, an equalizer extending between and carried on said axles, a pedestalless truck frame spring-supported on said equalizer, and a device extending transversely of the truck substantially above each of said axles and positioned outwardly of one of the adjacent wheels and yieldingly connected at its ends to the truck frame and to the equalizer respectively and resisting relative movement of the connected portions of the equalizer and frame transversely of the truck and accommodating their relative movements vertically of the truck, the equalizer and frame being free of other connections, at points spaced from said axles longitudinally of the truck, which would hold the equalizer and frame against relative movement transversely of the truck.

2. Railway truck structure as described in claim 1 which includes a device extending longitudinally of the truck and connected to portions of said equalizer and frame and holding the same against substantial relative movement longitudinally of the truck.

3. In a railway truck, spaced axles with journal boxes, an equalizer extending between and carried on boxes at the same side of the truck, a truck frame spring-supported on said equalizer, a bracket on said frame extending laterally of the truck in one direction substantially over one of said axles, a bracket on said equalizer extending laterally of the truck in the opposite direction substantially over said axle, and a device connected at its ends to the ends of said brackets and positioning the frame and equalizer relative to each other transversely of the truck and accommodating their relative vertical movement, the portion of the frame bracket to which one end of the device is connected being provided with an open end slot to accommodate movement of the device at right angles to its length into and out of assembled relation with the bracket and thereby accommodate assembly and disassembly of the device and equalizer while the frame and equalizer are assembled with each other.

4. In a railway truck, spaced axles, an equalizer extending between and carried on said axles, a truck frame spring-supported on said equalizer and including a wheel piece having an upwardly extending recess over one of said axles, a bracket on said wheel piece projecting outwardly of the truck and downwardly adjacent to said recess, a bracket on said equalizer projecting inwardly of the truck and upwardly adjacent to said recess, and a device extending transversely of the truck through said recess and secured at its ends to said brackets and positioning the equalizer and the frame relative to each other transversely of the truck and accommodating their relative vertical movement.

5. In a railway truck, spaced axles, an equalizer extending between and carried on said axles and having a transverse aperture, a truck frame spring-supported on said equalizer, an elongated device extending transversely of the truck and through said aperture, a connection between said equalizer and the one end of said device, and a connection between said frame and the other end of said device, said device positioning the frame and the equalizer relative to each other transversely of the truck but accommodating their relative vertical movement.

6. In a railway truck, spaced axles, an equalizer extending between and carried on said axles, a truck frame spring-supported on said equalizer and including a wheel piece having an inverted U-shape section over each axle, an adjacent portion of the equalizer extending upwardly into said section and being provided with a transverse aperture, an elongated device extending transversely of the truck and through said aperture, a connection between said equalizer and the one end of said device, and a connection between said frame and the other end of said device, said device positioning the frame and the equalizer relative to each other transversely of the truck but accommodating their relative vertical movement.

7. In a railway truck, spaced axles, an equalizer extending between and carried on said axles, a truck frame spring-supported on said equalizer and including a wheel piece recessed upwardly over each axle, there being a space between the lower face of the recessed portion of the wheel piece and the top of the adjacent portion of the equalizer, an elongated device extending transversely of the truck and through said recess and over the adjacent portion of the equalizer, a connection between said equalizer and the one end of said device, and a connection between said frame and the other end of said device, said device positioning the frame and the equalizer relative to each other transversely of the truck but accommodating their relative vertical movement.

8. In a railway truck, spaced axles with journal boxes, an equalizer extending between and carried on boxes at the same side of the truck, a truck frame spring-supported on said equalizer, a bracket on said frame extending laterally of the truck in one direction substantially over one of said axles, a bracket on said equalizer extending laterally of the truck in the opposite direction substantially over said axle, and a device connected at its ends to the ends of said brackets and positioning the frame and equalizer relative to each other transversely of the truck and accommodating their relative vertical movement, the device comprising aligned links with their adjacent ends detachably secured to each other and with their outer ends individually secured to the frame and equalizer respectively so as to facilitate assembly of the disconnected parts with the frame and equalizer when the same are assembled with each other.

9. In a railway truck, spaced axles with journal boxes, an equalizer extending between and carried on boxes at the same side of the truck, a truck frame spring-supported on said equalizer, a bracket on said frame extending laterally of the truck in one direction substantially over one of said axles, a bracket on said equalizer extending laterally of the truck in the opposite direction substantially over said axle, and a device connected at its ends to the ends of said brackets and positioning the frame and equalizer relative to each other transversely of the truck and accommodating their relative vertical movement, the part of the frame bracket to which one end of the device is connected being detachable from the frame to facilitate assembly and disassembly of the device and the equalizer while the frame and equalizer are assembled with each other.

10. In a railway truck, spaced axles with wheels and journal boxes, equalizers extending between said axles and carried on said boxes, a pedestal-less truck frame spring-supported on said equalizers and including wheel pieces extending over said journal boxes, and an elongated member positioned outwardly of the truck relative to the adjacent wheel and having yielding connections at its ends to portions of the equalizer and truck frame wheel piece respestively in substantially the same transverse vertical plane as the adjacent axle, said frame and members forming the sole means spacing the equalizers transversely of the truck and said members forming the sole means maintaining the position of the frame transversely of the truck relative to the equalizers.

11. A railway truck as described in claim 10 in which the boxes and equalizers are provided with opposing elements other than the members spacing the equalizers and frame transversely of the truck, said elements maintaining the relative positions of the boxes and equalizers transversely and longitudinally of the truck, and the axles and journal boxes being removable from the equalizer and frame structure without disassembling the connections between said members and the equalizer and the frame

H. M. PFLAGER.